No. 724,923. PATENTED APR. 7, 1903.
H. B. McNULTY.
WEIGHING SCALE.
APPLICATION FILED OCT. 31, 1901.
NO MODEL. 2 SHEETS—SHEET 1.
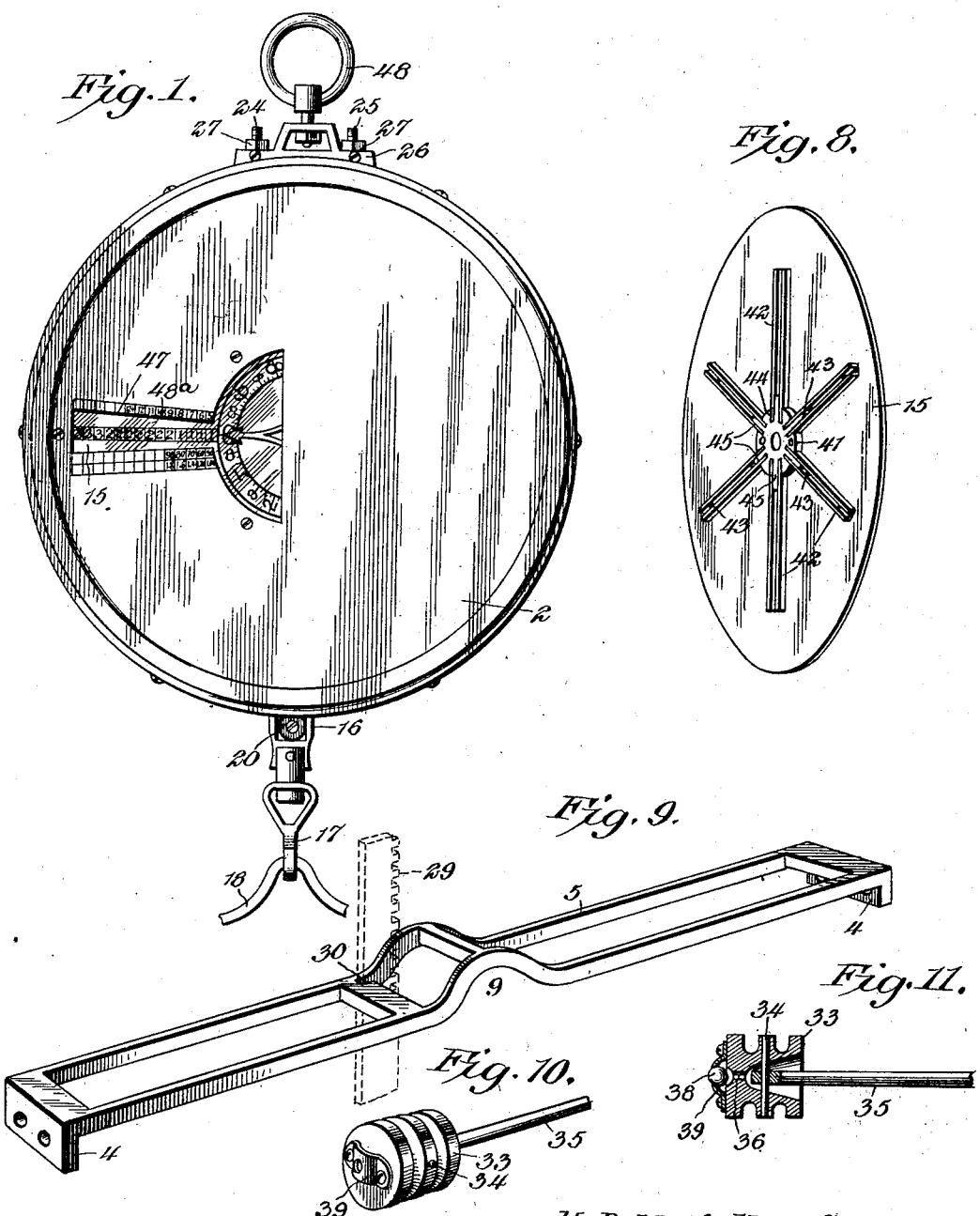

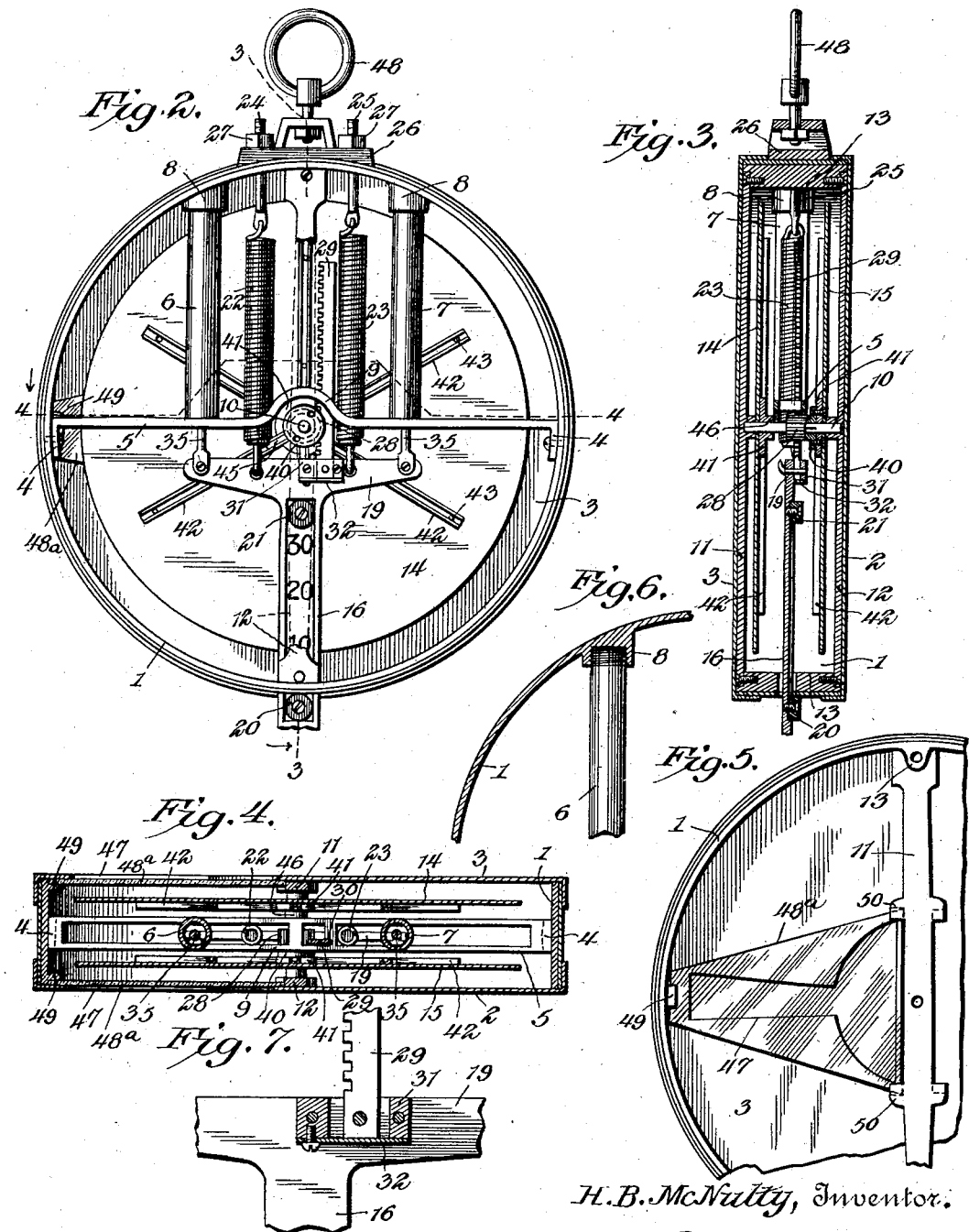

UNITED STATES PATENT OFFICE.

HARRY B. McNULTY, OF WASHINGTON, DISTRICT OF COLUMBIA.

WEIGHING-SCALE.

SPECIFICATION forming part of Letters Patent No. 724,923, dated April 7, 1903.

Application filed October 31, 1901. Serial No. 80,671. (No model.)

*To all whom it may concern:*

Be it known that I, HARRY B. MCNULTY, a citizen of the United States, residing at Washington, in the District of Columbia, have invented a new and useful Weighing-Scale, of which the following is a specification.

This invention relates to improvements in spring-balance computing-scales of that class characterized by a casing within which is journaled a shaft carrying a weighing and computing dial arranged to be operated by a draft-bar geared to the shaft and extended below the casing for attachment to the supporting-link of the scale-pan.

The object of the invention is to simplify the construction and to minimize the cost of manufacture of the scale and also to provide simple and effective cushioning devices which will prevent the injury and derangement of the mechanism, particularly the computing-dial, when the object to be weighed is suddenly placed upon or removed from the scale-pan.

A further object of the invention is to increase the capacity of the scale by providing it with a plurality of dials readable from the opposite sides of the casing, one dial being equipped with significant characters for the computation of prices up to a given limit per pound and the other dial being arranged to facilitate the computation of the price of the article being weighed when the price per pound exceeds the values which are readable upon the first-named scale.

Further and subordinate objects of the invention will hereinafter more fully appear as the succeeding description of that preferred form of my invention illustrated in the accompanying drawings is developed.

In said drawings, Figure 1 is an elevation of my scale complete. Fig. 2 is a similar view with one of the cap-plates and one of the dials removed. Fig. 3 is a sectional view on the line 3 3 of Fig. 2. Fig. 4 is a similar view on the line 4 4 of Fig. 2. Fig. 5 is a detail view showing the manner in which each of the glass plates is supported by the frame and one of the bridge-plates. Fig. 6 is a detail sectional view, partly in elevation, showing the manner in which the cylinders are connected to the frame. Fig. 7 is a detail sectional view of the connection between the draft-bar and the rack. Fig. 8 is a detail perspective view of one of the dials looking toward the rear side thereof and showing the manner in which the dial is stiffened by a skeleton frame or spider. Fig. 9 is a detail perspective view of the supporting-bar, and Figs. 10 and 11 are detail views of one of the plungers.

Referring to the numerals employed to designate corresponding parts throughout the views, 1 indicates a circular frame, preferably constructed of cast metal, and constituting, with a pair of cap-plates 2 and 3, a substantially circular casing, within which the operative parts of the mechanism are housed. Upon the interior face of the frame 1, at diametrically opposite points, are screwed the terminal lugs or feet 4 of what I shall term a "frame member" or "supporting-bar" 5, preferably of light open construction, as shown in Fig. 9 of the drawings, and designed to stiffen the frame as well as to constitute a support for the inner ends of a pair of cushioning-cylinders 6 and 7, the outer ends of which are screwed into sockets 8, fixed to and preferably cast integral with the inner face of the circular frame 1.

At its middle the supporting-bar 5 is bent or deflected, as indicated at 9, to accommodate the dial-shaft 10, disposed axially within the casing and having bearings at its opposite ends in a pair of bridge-plates 11 and 12, disposed diametrically across the frame at opposite sides thereof and screwed or otherwise secured to inwardly-extending lugs 13, cast upon the inner face of the circular frame 1. It will be noted that the supporting-bar 5 and the bridge-plates 11 and 12 are all disposed diametrically within the frame, but that the bridge-plates are in a plane at right angles to the supporting-bar and at opposite sides of the latter. By this arrangement of these necessary supporting elements of the weighing mechanism they are utilized to greatly stiffen the shell or casing, which is of necessity of light construction. Furthermore, the bridge-plates are located adjacent to the opposite edges of the frame and besides constituting rigid stiffening members for the circular frame 1 and bearing members for the dial-shaft also constitute backings for the thin sheet-metal cap-plates 2 and 3.

The dial-shaft 10, which, as we have seen, is provided with bearings in the bridge-plates, is designed for the rotatable support of a pair of weighing and computing dials 14 and 15, mounted on the shaft adjacent to the opposite ends thereof and provided, as usual, with significant characters, which in accordance with my invention are designed to be read from opposite sides of the casing. As is usual in this class of devices the dial-shaft is designed to be rotated by the movement of a draft-bar 16, to the lower end of which is attached a swiveled hook 17 for attachment to the link or bail 18 of the scale-pan. (Not illustrated.)

The draft-bar 16 is provided at its upper end within the casing of the scale with a head 19 and projects through the circular frame 1 at the bottom of the scale, being preferably provided adjacent to its opposite ends with rubber buffers 20 and 21, which contact with the frame 1 at the opposite limits of movement of the draft-bar and serve to prevent possible injury to the parts.

22 and 23 indicate a pair of balance-springs secured at their lower ends to the head 19 and attached at their upper extremities to a pair of spring-adjusting rods 24 and 25, passed through the frame 1 and through a heavy integral bracket 26, beyond which latter the rods 24 and 25 are screw-threaded for the reception of adjusting-nuts 27, by means of which the adjusting-rods may be moved longitudinally to regulate the tension of either or both of the springs, as desired. By this means change in the zero-point, due to the wear of the springs or any of the operative parts, may be corrected and the dials adjusted so as to accurately register both the weight of the article and the computed price at any given value per pound. The rotation of the dials is effected, as heretofore stated, through the reciprocation of the draft-bar 16 by means of suitable gearing. In the present instance this gearing comprises a pinion 28, fixed on the dial-shaft at a point intermediate of the bridge-plates 11 and 12 and meshing with a rack 29, guided by the supporting-bar 5, as indicated at 30, and pivoted at its lower end within a bearing-bracket 31, mounted upon the head 19 of the draft-bar. To the under side of this bracket 31 is screwed a flat spring 32, bearing against the lower end of the rack below the pivot thereof for the purpose of yieldingly retaining the rack in a truly vertical position, but permitting such slight vibration of the rack as is necessary to insure smooth working of the parts.

It will now be evident that if a considerable weight is thrown upon the scale-pan or is quickly removed therefrom the draft-bar 16 will be urged in one direction or the other with considerable violence, and such movement of the parts would tend at least to disarrange the dials. It is for the purpose of preventing the happening of this contingency that I contemplate the equipment of the scale with powerful cushioning devices arranged in a novel manner. It has been stated that the cylinders 6 and 7 are disposed between the supporting-bar 5 and the circular frame 1 of the casing, and by reference to Fig. 2 of the drawings it will be noted that in each of these cylinders is mounted a piston or plunger 33, pivotally connected, as by a transverse pintle 34, with the upper end of a piston-rod or plunger-stem 35. These rods or stems are pivotally connected at their lower ends to the opposite extremities of the transverse head 19 of the draft-bar. These plungers 33 are designed to present little or no resistance to the downward movement of the draft-bar when the object to be weighed is placed upon the pan, but are designed with special reference to the opposing of a considerable resistance to the upward or retractile movement of the bar and pan under the impulse of the balance-springs when the object has been suddenly lifted from the pan. I therefore provide each plunger with an axial vent 36, having an enlargement at its upper end constituting a valve-seat for the reception of a ball-valve 38, held within operative limits by a valve-cage 39, screwed upon the upper end of the plunger. It will now be seen that as the draft-bar is drawn down the ball-valve 38 of each plunger will be lifted from its seat and air will pass through the vent 36 and into the cylinder above the plunger. When, however, the draft-bar is suddenly relieved—as, for instance, by the removal of the object from the pan—the valve 38 will be automatically seated, and the compression of the air within the upper end of the cylinders will prevent the parts from being retracted violently by the springs. The gradual retraction of the parts will be permitted, however, by the escape of the air around the plungers. It should also be noted that the axial vent through each plunger is enlarged at its lower end to form a socket for the upper end of a plunger-stem which engages a pintle extending transversely across the upper end of the socket, as shown in Fig. 11.

It has been proposed to provide scales of this class with spring-buffers or similar cushioning devices in alinement with the draft-bar; but this location practically precludes the employment of a cushioning device of sufficient resistance for scales upon which considerable weight is intended to be imposed. It is for this reason that I have conceived the idea of providing a plurality of pneumatic cushioning devices disposed at like distances beyond opposite sides of the draft-bar and having such connection therewith as will tend to prevent undue lateral vibration and having such relation to the balance-springs as will maintain the position of the draft-bar in the event of one of said springs being of greater power than the other. In other words, these pneumatic cushions disposed as illustrated constitute, in effect, an equalizing device for the springs.

The manner of securing the dials 14 and 15 upon the dial-shaft is not material; but I prefer to provide the shaft adjacent to one end of the pinion 28 with a fixed disk 40, against the face of which is screwed the hub 41 of the dial 15. This hub is preferably formed of aluminium and is retained by the inner ends of a number of radially-disposed stiffening-arms 42, which are imposed against the back face of the dial, preferably an aluminium disk, and attached thereto by suitable fastening devices—as, for instance, the rivets 43. These radial stiffening-arms are preferably constructed of light sheet metal, which is bent to impart a U-shaped transverse contour to the arms, an interlocking engagement between the arms and the hubs being afforded by means of kerfs 44, formed in the periphery of the hub for the reception of the side flanges of the arms, and lugs or projections 45, extending from the hub into the arms, as shown in Fig. 8.

The dial 14 at the opposite side of the scale is constructed in a manner similar to that described, but instead of being secured to a fixed disk upon the shaft is provided with a collar 46, extending rearwardly from the hub 41 and keyed to the shaft, as shown in Fig. 3 of the drawings. Upon the outer faces of the dials are imprinted suitable characters constituting the weighing-scales or graduations indicative of the weight imposed upon the scale-pan, and said dials are also equipped with a series of numbers designed for presentation before suitable sight-openings 47 in the cap-plates 2 and 3 and indicative of the total values of objects being weighed, one dial being designed for the computation of values up to a given price per pound and the other dial being designed in a similar manner to facilitate the computation when the price per pound is in excess of the capacity of the first dial. I have deemed it unnecessary to illustrate these dials in detail, inasmuch as the equipment thereof with proper characters is not contemplated within the purview of the present invention and is well understood in the art, having been shown in Letters Patent No. 666,626, heretofore granted to Benjamin McNulty and myself. It may be noted, however, in conclusion that the scale is designed to be supported by a swiveled ring 48, having its axis in alinement with the axis of the swiveled hook 17, so that the scale may be turned freely to facilitate the inspection of either of the dials without necessitating the turning of the scale-pan.

As clearly shown in Figs. 1, 4, and 5, each of the sight-openings 47 in the cap-plates is backed by a transparent, preferably glass, plate 48ª, supported at its opposite ends by the frame and the adjacent bridge-plate, respectively. The frame is provided with a lug 49, upon which one end of the glass rests, and the adjacent bridge-plate is provided with a pair of lugs 50, which are recessed, as shown, to form a seat for the opposite end of the glass. When these glass plates are in place, they are retained against displacement by the cap-plates 2 and 3, which are imposed directly against the glass.

It is thought that from the foregoing the construction and operation of my device will be clearly apparent; but while the present embodiment of the invention is thought at this time to be preferable I wish to reserve the right to effect such changes, modifications, and variations of the illustrated structure as may be suggested by experience and experiment, provided only that such variations are properly embraced within the scope of the protection prayed.

What I claim is—

1. In a spring-balance scale, the combination with a frame comprising a ring and a dimetrical supporting-bar, of a draft-bar provided with a head, a pair of cylinders secured to the frame and extended to the supporting-bar, plungers within the cylinders, plunger-rods connected therewith and with the head, balance-springs disposed between the cylinders and connected to the frame and head, respectively, a dial, and means for operating the dial through the movement of the draft-bar.

2. In a spring-balance scale, the combination with a frame comprising a ring, a pair of diametrically-disposed bridge-plates, and an intermediate diametrical supporting-bar disposed substantially at right angles to the bridge-plates, of a draft-bar provided with a transverse head, a pair of cylinders secured to the frame and extended to the supporting-bar, plungers within said cylinders, plunger-rods pivotally connected with the plungers and with the opposite ends of the head, a pair of balance-springs disposed between the cylinders and connected to the frame and head, respectively, a dial-shaft journaled at its opposite ends in the bridge-plates, a dial carried by said shaft, and means for operating said shaft through the medium of the draft-bar.

3. In a spring-balance scale, the combination with a frame comprising a ring, a pair of diametrically-disposed bridge-plates, and an intermediate diametrical supporting-bar, of a draft-bar, a pair of cylinders secured to the frame and extended to the supporting-bar, a pair of balance-springs disposed between the cylinders and connected to the frame and head, respectively, a dial-shaft journaled at its opposite ends in the bridge-plates, a plurality of dials mounted on said shaft between the supporting-bar and bridge-plates and provided with computing-scales disposed in reverse order, and means for operating said shaft through the medium of the draft-bar.

4. In a spring-balance scale the combination with a frame comprising a ring, and a diametrical supporting-bar, of a draft-bar provided with a head, a pair of cylinders screwed to the frame at their upper ends and extended to the supporting-bar, plungers within the cylinders, plunger-rods connected therewith and with the head, balance-springs disposed between the cylinders and connected to the head and frame, respectively, dials disposed at opposite sides of the supporting-bar, and means for operating the dial through the movement of the draft-bar.

5. In a spring-balance scale, the combination with a frame comprising a ring and a diametrical supporting-bar, of a draft-bar provided with a head, a pair of threaded sockets extending inwardly from the frame-ring, a cylinder screwed into each of said sockets and having its opposite end open and located at the supporting-bar, plungers within the cylinders, plunger-rods connected therewith and with the head, balance-springs disposed between the cylinders and connected to the frame and head, respectively, a dial, and means for operating the dial through the movement of the draft-bar.

6. In a spring-balance scale, the combination with a frame, comprising a ring and a diametrical supporting-bar, of a pair of internally-threaded sockets extending inwardly from the ring at a point above the supporting-bar, cylinders screwed into said sockets and extended to the bar, plungers within the cylinders, plunger-rods connected to the plungers and extended through the supporting-bar for attachment to the head of the draft-bar, balance-springs disposed between the cylinders and connected to the frame and head, respectively, diametrically-disposed bridge-plates located at opposite sides of the supporting-bar and disposed substantially at right angles thereto, a dial-shaft journaled in the bridge-plates, a dial mounted on said shaft, and means for rotating the shaft through the movement of the draft-bar.

7. In a spring-balance scale, the combination with a frame comprising a ring and a diametrical supporting-bar, of diametrically-disposed bridge-plates located at opposite sides of the supporting-bar and disposed substantially at right angles thereto, a dial-shaft journaled in the bridge-plates, a dial and a pinion both mounted on the dial-shaft for movement therewith, a draft-bar provided with a head, balance-springs, cushioning devices connected with said head, and a toothed rack carried by the head and engaging the pinion, said rack being passed through the supporting-bar and having a bearing therein.

8. In a spring-balance scale, the combination with a frame comprising a ring and a diametrical supporting-bar, of diametrical bridge-plates disposed at the opposite sides of the supporting-bar and at right angles thereto, a draft-bar provided with a head, internally-threaded sockets extended inwardly from the ring, cylinders screwed into said sockets and extended to the supporting-bar, plungers within the cylinders, plunger-rods connected to the plungers and passed through the supporting-bar for attachment to the head of the draft-bar, balance-springs located between the cylinders and passed through the supporting-bar, for attachment to said head, a dial-shaft journaled in the bridge-plates and provided with a plurality of dials and an intermediate pinion, and a toothed rack-bar pivoted to the head of the draft-bar and having a bearing in the supporting-bar, said rack-bar being in mesh with the pinion on the dial-shaft to effect the rotation thereof.

9. In a scale, the combination with a circular frame, and a diametrical bridge-plate provided, respectively, with depressed seats, of a transparent plate supported in the seats of the frame and bridge-plate, respectively, and a cap-plate fitted over the frame to retain the transparent plate in place, said cap-plate being provided with a sight-opening protected by the transparent plate.

10. In a scale, the combination with a frame, a dial-shaft, a dial, and a draft-bar operatively related to the shaft, of springs resisting the movement of the draft-bar, and a cushioning device for preventing the sudden retraction of the draft-bar, said cushioning device comprising a cylinder, a plunger mounted therein and having an axial vent enlarged at one end to form a valve-seat and having a greater enlargement at its opposite end forming a socket, a ball-valve disposed to occupy the valve-seat, a cage inclosing the valve and secured to the upper end of the plunger, a pintle passed transversely through the plunger and intersecting the upper end of the socket and a plunger-rod extended into the socket in the plunger and having pivotal connection at its opposite ends with the pintle and draft-bar.

11. In a scale, the combination with a circular frame, and bridge-plates rigidly fixed therein, of a frame member interposed between the bridge-plates and disposed in angular relation thereto, said bridge-plates and frame member serving to stiffen the frame in different directions, cap-plates fitted on the opposite sides of the frame and backed by the bridge-plates, a dial-shaft having bearings in the bridge-plates, dials mounted on the shaft between the frame member and bridge-plates, a draft-bar geared to the shaft, and springs resisting the movement of the draft-bar.

12. In a scale, the combination with a circular frame, and a frame member secured within the frame, of cylinders secured at their outer ends to the circular frame and having their inner ends extended to the frame member to unite the circular frame, the frame member and the cylinders in a rigid structure, a dial-shaft, a dial thereon, a draft-bar geared to the dial-shaft, plungers movable within the cylinders and having operative connection with the draft-bar, and springs resisting the movement of the draft-bar.

13. In a scale, the combination with a circular frame, and cylinders having their ends secured to the frame, of means for rigidly retaining the inner ends of the cylinders to prevent lateral vibration thereof, a dial-shaft, a dial thereon, a draft-bar geared to the dial-shaft, plungers movable within the cylinders and operatively connected to the draft-bar, and springs resisting the movement of said draft-bar.

14. In a scale, the combination with a circular frame provided with inwardly-extending sockets, of cylinders having their outer ends screwed into the sockets of the frame, bridge-plates extending across the frame to stiffen the same, a dial-shaft journaled in the bridge-plates, a dial on the shaft, a draft-bar geared to the shaft, plungers movable within the cylinders and operatively related to the draft-bar, and springs resisting the movement of said bar.

15. In a scale, the combination with a casing, a dial-shaft rotatable therein, a dial on the shaft, a draft-bar extended through one wall of the casing and geared to the dial-shaft, and springs resisting the movement of the draft-bar, of yielding buffers mounted upon the draft-bar adjacent to its opposite ends and arranged to strike against the opposite sides of the wall of the casing to limit the movement of the draft-bar in opposite directions.

16. The combination with a frame, of a dial comprising a thin metallic disk, a series of radial transversely U-shaped stiffening-arms riveted to the back of the disk, and a molded hub uniting the inner ends of the stiffening-arms and having projecting portions extending between the arms and between the side flanges of each arm whereby the arms constitute the support for the hub.

In testimony that I claim the foregoing as my own I have hereto affixed my signature in the presence of two witnesses.

HARRY B. McNULTY.

Witnesses:
GEORGE S. TATE,
HARRY S. WELCH.